United States Patent
Cocchi et al.

(10) Patent No.: US 9,320,290 B2
(45) Date of Patent: Apr. 26, 2016

(54) HOME AND PROFESSIONAL ICE CREAM PRODUCT MAKING MACHINE

(75) Inventors: Andrea Cocchi, Calderara Di Reno (IT); Roberto Lazzarini, Reggio Emilia (IT)

(73) Assignee: ALI S.P.A.—CARPIGIANI GROUP (IT)

( * ) Notice: Subject to any disclaimer, the term of this patent is extended or adjusted under 35 U.S.C. 154(b) by 50 days.

(21) Appl. No.: 13/180,133

(22) Filed: Jul. 11, 2011

(65) Prior Publication Data

US 2012/0017606 A1    Jan. 26, 2012

(30) Foreign Application Priority Data

Jul. 22, 2010   (IT) ............... BO2010A0466

(51) Int. Cl.
  *A23G 9/04* (2006.01)
  *A23G 9/22* (2006.01)
  *A23G 9/12* (2006.01)

(52) U.S. Cl.
  CPC ... *A23G 9/22* (2013.01); *A23G 9/12* (2013.01)

(58) Field of Classification Search
  CPC ............. A23G 9/04; A23G 9/08; A23G 9/10; A23G 9/12; A23G 9/221; A23G 9/224; A23G 9/075; A23G 9/045; F25B 2345/006; F25D 25/027; F25D 3/11
  USPC ......... 62/340, 299, 1, 63, 342, 381, 346, 345, 62/343, 68; 137/614.03, 614.04
  See application file for complete search history.

(56) References Cited

U.S. PATENT DOCUMENTS

| | | | | |
|---|---|---|---|---|
| 1,751,697 A | * | 3/1930 | Hull | 165/146 |
| 2,338,953 A | * | 1/1944 | Melke | 62/292 |
| 2,504,267 A | * | 4/1950 | Koeber | F25D 11/02 62/326 |
| 2,626,133 A | * | 1/1953 | Reed | 366/206 |
| 3,015,220 A | * | 1/1962 | Elfving | 62/435 |
| 3,041,852 A | * | 7/1962 | Palmer | 62/334 |
| 3,842,614 A | * | 10/1974 | Karcher et al. | 62/56 |
| 3,989,492 A | * | 11/1976 | Keyes | 62/136 |
| 3,995,659 A | * | 12/1976 | Cantore | F16L 37/23 137/614.03 |

(Continued)

FOREIGN PATENT DOCUMENTS

DE   202009014551       4/2010
DE   202009014551 U1 *  4/2010

(Continued)

OTHER PUBLICATIONS

Machine translation provided by European Patent Office, of FR 2542578 A3 printed Mar. 2013.*

(Continued)

*Primary Examiner* — Cassey D Bauer
*Assistant Examiner* — Kirstin Oswald
(74) *Attorney, Agent, or Firm* — Timothy J. Klima; Shuttleworth & Ingersoll, PLC

(57) ABSTRACT

An ice cream product making machine includes a main body, housing a refrigerating unit, and a secondary body, removably associated with the main body, including a mixing and cooling unit having a vertical axis interacting with the refrigerating unit, a lid allowing access to an interior and inside, a stirrer. The secondary body includes a hollow space surrounding the mixing and cooling unit and integral with it, containing a coolant to cool the mixing and cooling unit when the secondary body is associated with the main body, during machine operation, and to keep the mixing and cooling unit cool when the secondary body is separated from the main body.

15 Claims, 3 Drawing Sheets

(56) References Cited

U.S. PATENT DOCUMENTS

| | | | | |
|---|---|---|---|---|
| 4,392,361 | A | * | 7/1983 | Cavalli ............................. 62/343 |
| 4,441,334 | A | * | 4/1984 | Cipelletti ........................ 62/258 |
| 4,476,146 | A | * | 10/1984 | Manfroni ...................... 426/522 |
| 4,637,221 | A | * | 1/1987 | Levine ............................ 62/342 |
| 4,664,529 | A | * | 5/1987 | Cavalli .................... A23G 9/12 366/144 |
| 4,681,458 | A | | 7/1987 | Cavalli |
| 4,885,917 | A | * | 12/1989 | Spector ........................... 62/343 |
| 5,080,132 | A | * | 1/1992 | Manz et al. ............. 137/614.04 |
| 5,478,046 | A | * | 12/1995 | Szabo ........................ 251/149.6 |
| 5,680,769 | A | * | 10/1997 | Katz ........................ A23G 9/12 62/258 |
| 6,571,564 | B2 | * | 6/2003 | Upadhye et al. ................. 62/3.3 |
| 6,824,303 | B2 | * | 11/2004 | Huang .................... A23G 9/12 366/199 |
| 7,124,598 | B2 | * | 10/2006 | Quest et al. ..................... 62/292 |
| 7,878,021 | B2 | | 2/2011 | Perrier et al. |
| 2002/0088242 | A1 | * | 7/2002 | Williams ..................... 62/259.2 |
| 2002/0162577 | A1 | * | 11/2002 | Cocchi ..................... A23G 9/30 134/18 |

FOREIGN PATENT DOCUMENTS

| | | |
|---|---|---|
| EP | 0179027 | 4/1986 |
| EP | 1396195 | 3/2004 |
| FR | 2269308 | 11/1975 |
| FR | 2542578 A3 * | 9/1984 |
| FR | 2881928 | 8/2006 |
| GB | 1183551 | 3/1970 |
| GB | 2178150 | 2/1987 |

OTHER PUBLICATIONS

Machine Translation provided by European Patent Office, of DE 20200914551 U1 printed Mar. 2013.*

Search Report dated Mar. 28, 2011 from related foreign application.

* cited by examiner

HOME AND PROFESSIONAL ICE CREAM PRODUCT MAKING MACHINE

This application claims priority to Italian Patent Application BO2010A000466 filed Jul. 22, 2010, the entirety of which is incorporated by reference herein.

BACKGROUND OF THE INVENTION

This invention relates to a machine for making ice cream products for home and also professional use.

More specifically, this invention relates to a machine for making Italian-style ice cream ("gelato") and the like, especially for home use and consumption.

As is known, several machines of this kind are available on the market. These machines comprise a substantially box-shaped body housing a bowl which is equipped with a stirrer and which acts as a mixing and cooling chamber.

In gelato machines, the mixing and cooling chamber serves the function of mixing, chilling and blending a plurality of ingredients to make a creamy ice cream, a sorbet, or the like.

The ingredients can be placed directly into the mixing and cooling chamber by simply removing the chamber cover or through an opening located at the top of the box-shaped body and in fluid communication with the chamber.

When the ice cream is ready, the bowl can be taken out of the box-shaped body and the ice cream served directly into cups or cones.

To make ice cream, it is essential to chill the mixing and cooling chamber so as to keep the ingredients at a low temperature while they are mixing and solidifying.

Simpler, low-priced machines comprise a container housing the bowl in which the ingredients are mixed.

The container has a hollow space containing a coolant which accumulates cold beforehand and gives off the cold to the ingredients while they are being mixed. In effect, prior to use, the bowl must be placed in a freezer or freezer compartment for several hours, usually not less than 24 hours, to allow the coolant to accumulate cold. The container can be used to make ice cream only after this has been done, since only then is the cold build-up sufficient to chill and keep the mixture in the mixer and cooler at a low temperature.

By the time the ingredients have been worked and the ice cream is ready, the coolant has lost its cooling power and is no longer able to keep the container at a low temperature: the ice cream must therefore be eaten immediately, before it melts, or transferred to other containers and placed in the refrigerator or freezer.

Also available on the market are higher-priced, and more sophisticated machines for making ice cream in the home. These machines are equipped with self-contained cooling systems which can continuously produce the cold needed to make the ice cream. A refrigerating circuit is built into the box-shaped body to keep the mixing and cooling bowl at a constantly low temperature.

The bowl can then be removed from the machine to allow the ice cream to be served.

In this case, too, once ready, the ice-cream must be eaten within a few minutes because the refrigerating system works only when the ice cream is being made, with the stirring blades in operation, and switches off when stirring is stopped. In more advanced machines, the refrigerating system continues to work even when the blades are stopped so as to keep the ice cream at the right temperature and consistency, ready for eating. Once the bowl is removed, however, the ice cream keeps the right consistency only for a short time and must be put back into the machine promptly since the refrigerating system is built into the machine.

Thus, with machines currently available on the market, the ice cream, must be eaten immediately or transferred into suitable containers and frozen.

The mixing and cooling bowl cannot be left on the table or separate from a source of cold long enough to enjoy one helping of ice cream and, if desired, a second helping, without the risk of the ice cream melting between one serving and the next.

With obvious inconvenience, the container must therefore be placed in the refrigerator after each serving and taken out again if a second helping is desired.

SUMMARY OF THE INVENTION

In this context, the aim of this invention is to overcome the above mentioned disadvantage.

More specifically, this invention has for an aim to provide a home and professional ice cream product making machine which allows the mixing and cooling unit to be kept separate from the machine and, more generally, from a source of cold for an extended length of time without allowing the ice cream to melt, so that ice cream can be served directly from the mixing and cooling unit at two or more different times without having to put it back into the refrigerator each time.

Accordingly, this invention achieves this aim with a home and professional ice cream product making machine comprising the features described in one or more of the appended claims.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred, non-limiting example embodiment of the invention and in which:

DESCRIPTION OF THE PREFERRED EMBODIMENTS

With reference to the accompanying drawings, the numeral 1 denotes in its entirety a home and professional ice cream product making machine made according to this invention.

Figure 1:
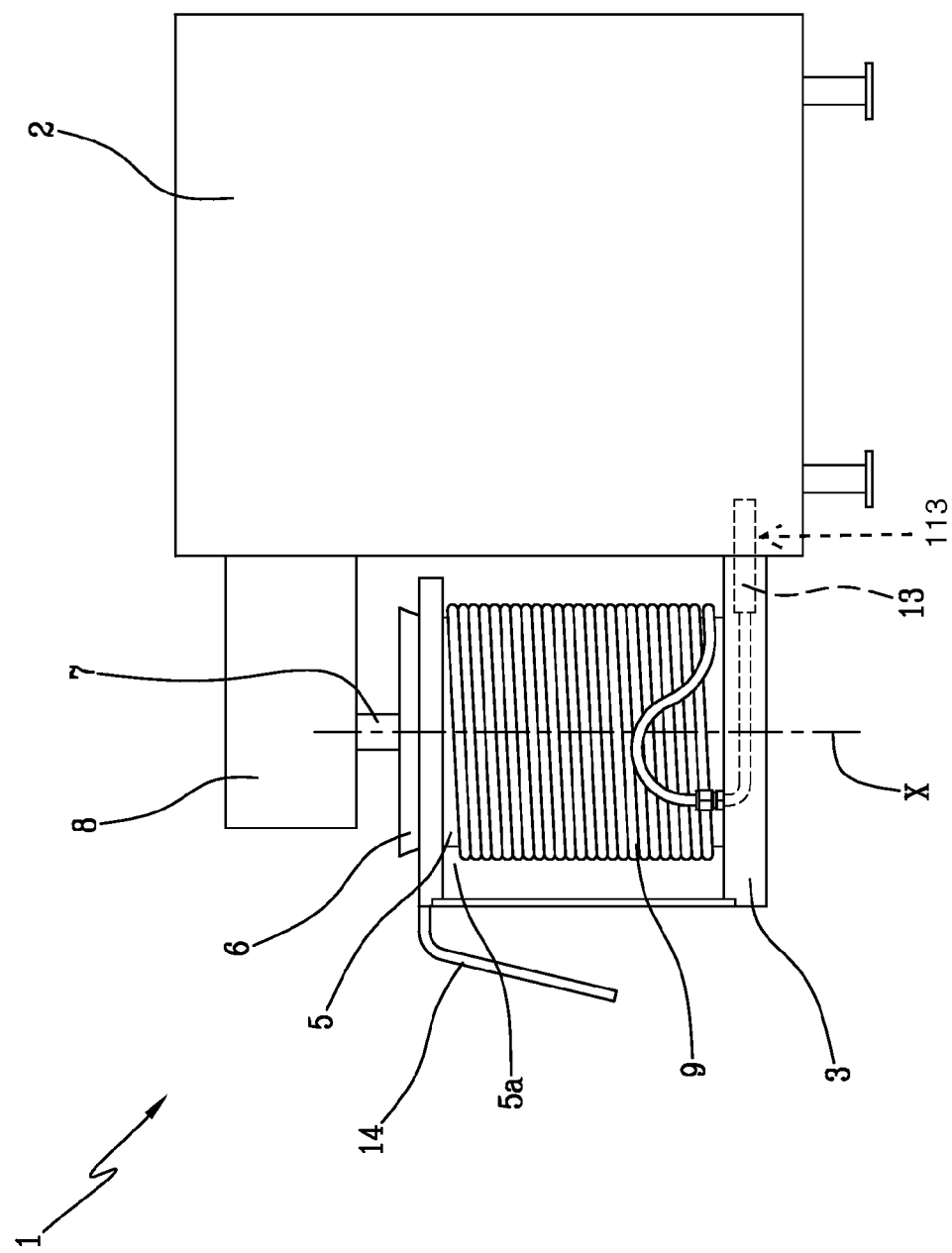
FIG. 1 is a schematic view of a home and professional ice cream product making machine in accordance with this invention.

With reference to FIG. 1 in particular, the machine 1 comprises a main body 2 and a secondary body 3, removably associated with the main body 2.

The main body 2 houses a refrigerating unit 4, while the secondary body 3 comprises a mixing and cooling unit 5, with a vertical axis X, interacting with the refrigerating unit 4.

The mixing and cooling unit 5 has, at one end of it 5a, a lid 6 which opens and closes access to the inside of the mixing and cooling unit 5 itself.

A stirrer 7 is rotatable inside the mixing and cooling unit 5, driven by a motor 8 mounted inside the lid 6 or in the main body 2, as illustrated in FIG. 1.

The refrigerating unit 4 is a customary unit consisting of a sealed compressor, a condenser, a fan and an evaporator, capable of supplying the required cooling power in a very short space of time.

The secondary body 3 comprises a hollow space 9, surrounding the mixing and cooling unit 5 and built into it, containing a coolant serving to cool the mixing and cooling unit 5 when the secondary body 3 is connected to the main body 2, during normal machine operation, and to keep the mixing and cooling unit 5 cool when the secondary body 3 is separated from the main body 2.

The hollow space 9 may be in the shape, for example, of a coil wound around the mixing and cooling unit 5 or it may be a single chamber surrounding the mixing and cooling unit 5.

The secondary body 3 is removably connected to the main body 2 advantageously by a fluid and a mechanical connection.

More specifically, both connections are made using suitable quick coupling means.

To facilitate handling of the secondary body 3 and thus of the mixing and cooling unit 5, the secondary body 3 comprises a grip element 14, such as a handle, for example.

The coolant is cooled by the refrigerating unit 4 of the main body 2.

In a first embodiment, not illustrated, the hollow space 9 surrounding the mixing and cooling unit 5 is in direct fluid communication with the refrigerating unit 4. In this case, the hollow space 9 is the evaporator of the refrigerating unit 4 itself and the coolant which circulates in the hollow space 9 is the same as the one which circulates in the refrigerating unit 4.

After mixing and cooling the ice cream, the entire secondary body 3 is disconnected from the main body 1, not only separating it mechanically but also interrupting the fluid communication between the hollow space 9 and the rest of the refrigerating unit 4.

The coolant trapped in the hollow space remains cool and keeps the mixing and cooling unit at a low temperature even after the latter has been separated from the main body 2 and from the refrigerating unit 4.

Figure 2:
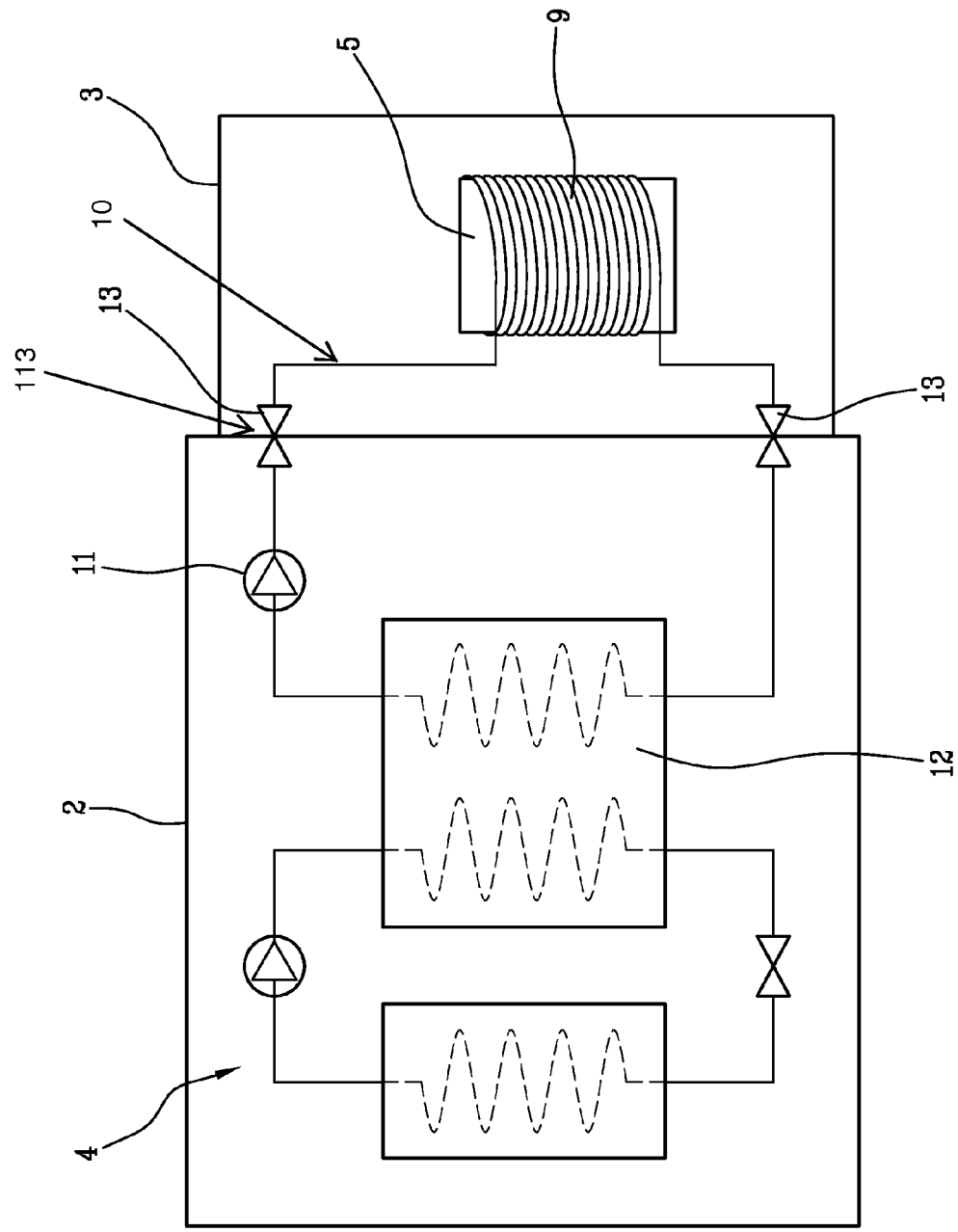
FIG. 2 is a preferred function diagram of a part of the machine of FIG. 1.

A preferred configuration, illustrated schematically in FIG. 2, comprises a cooling circuit 10 separate from the refrigerating unit 4 but nevertheless cooled by the latter.

In this case, a first coolant flows inside the refrigerating unit 4 and a second coolant flows inside the cooling circuit 10.

The cooling circuit 10 is housed at least partially inside the secondary body 3 and comprises the hollow space 9 which surrounds the mixing and cooling unit 5.

More specifically, the cooling circuit 10, which comprises a pump 11 to make a coolant flow in the circuit itself, is also partially housed in the main body 2; in effect, it passes through the evaporator 12 of the refrigerating unit 4 where the second coolant is cooled.

In this case, too, when the ice cream is ready, the secondary body 3 is separated from the main body 2, thus interrupting the fluid communication in the cooling circuit 10, accomplished by suitable quick coupling means, an example of which is described below.

The aforesaid quick coupling means comprise at least two quick coupling valves 113 designed to isolate fluid dynamically the two parts of the refrigerating unit 4 or of the cooling circuit 10, thus preventing the coolant in the pipes from escaping or leaking. In other words, when the secondary body 3 is engaged to or disengaged from the main body 2, the quick coupling means must isolate the coolant inside the hollow space 9, which remains integral with the secondary body 3, and inside the part of the unit or circuit that remains integral with the main body 2, thus preventing coolant loss during engagement or disengagement.

The valves 13 are located at respective points of contact between the main body 2 and the secondary body 3.

Figure 3:
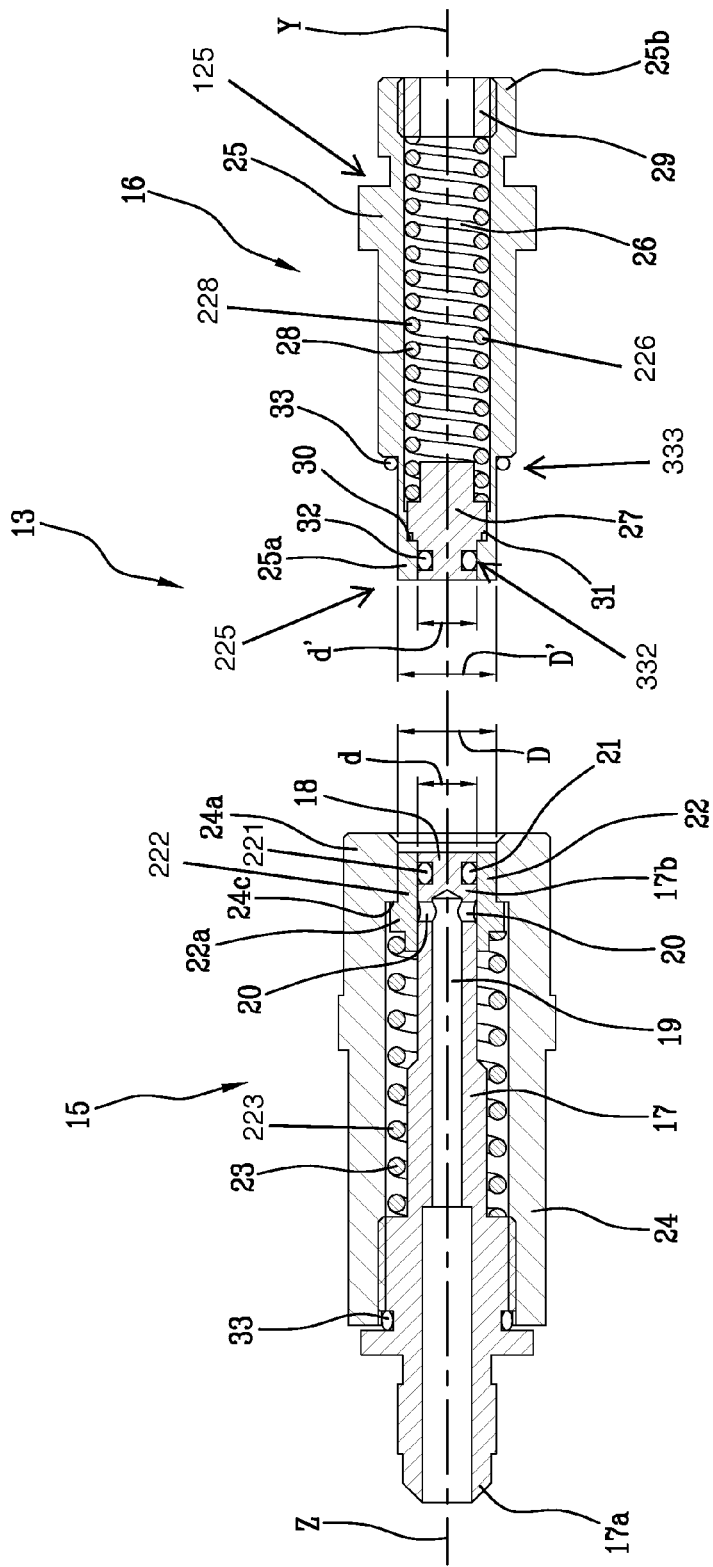
FIG. 3 is a cross section of a detail of the machine of FIG. 1.

FIG. 3 shows an example of a quick coupling valve 113 used in the machine 1 according to the invention.

The valve 13 has a main connecting body 15 and a complementary connecting body 16 designed to interpenetrate each other.

More specifically, the main connecting body 15 presents a hollow, cylindrical element 17 connected at a first end of it 17a to a part of the refrigerating unit 4 or of the cooling circuit 10, and at a second end of it 17b to a head 18 which seals the internal duct 19. Near the head 18, the cylindrical element 17 presents at least one radial hole 20, preferably two holes located diametrically opposite each other, which places the internal duct 19 in fluid communication with the cylindrical element 17.

The head 18 has on the outside of it a ring seal 221 which surrounds it and which is designed to sealingly press against a cylindrical slider 222 located outside the cylindrical element 17 and slidable along its longitudinal axis Z.

The travel of the slider 22 is limited on one side by a helical spring 223 placed around the cylindrical element 17, between the first end 17a of the cylindrical element 17 and the selfsame slider 22. In the rest position, the spring 23 keeps the slider 22 near the second end 17b of the hollow cylindrical element 17, in such a way that it is positioned over the radial holes 20 and thus closes the internal duct 19.

Around the hollow cylindrical element 17 and the slider 22 there is a sleeve member 24, which is screwed to the cylindrical element 17.

The sleeve member 24 has, near an end of it 24a corresponding to the second end 17b of the cylindrical element 17, an internal shim 24c abutting against an annular flange 22a of the slider 22. This limits the outward travel of the slider 22 which, when the sleeve member 24 is screwed to the cylindrical element 17, cannot slide off the latter.

The complementary connecting body 16 in turn has an internally hollow cylindrical element 125 matching the cylindrical element 17 of the main connecting body 15. More specifically, near a first end of it 25a, the outside dimensions of the complementary cylindrical element 25 are such that the element can be inserted into the sleeve member 24 and its inside dimensions such as to receive the cylindrical element 17 in its internal duct 226.

The internal duct 226 of the complementary cylindrical element 25 is a through duct and extends along the entire longitudinal axis Y.

At a second end of it 25b, the complementary cylindrical element 25 is in fluid connection with the hollow space 9, whereas at the first end of it 25a, it is connected to the main connecting body 15.

At the first end of it 25a, the complementary cylindrical element 25 has a slider 27 that runs inside the duct 26 along the longitudinal axis Y.

On one side, the travel of the slider 27 is limited by an opposing helical spring 228 located inside the duct 26 and placed between the slider 27 and the second end 25b of the complementary cylindrical element 25.

An internal nut 29 screwed to the second end 25b of the complementary cylindrical element 25 allows the tension of the spring 28 to be varied depending on how far it is screwed into the duct 26.

The complementary cylindrical element 25 has, near a first end of it 25a, an internal annular shim 30 abutting against an annular flange 31 of the slider 27. This limits the travel of the slider 27 towards the outside of the duct 26.

Around the slider 27 there is an annular seal 332 which sealingly presses against the inside wall of the duct 26.

When the spring 28 is in the rest position, the slider 27 is at the second end of the complementary cylindrical element 25 to seal the internal duct 226.

Another two annular seals 333 are provided between the sleeve member 24 and the outside of the cylindrical element 17 and around the complementary cylindrical element 25 to create a tight closure against the sleeve member 24 during connection.

The diameter d of the head 18 of the cylindrical element 17 is equal to the diameter d' of the section facing the outside of the slider 27, in the same way as the outside diameter D' of the complementary cylindrical element 25 at the first end of it 25a is equal to the outside diameter D of the slider 22, measured at the section facing outwards. Thus, there is mutual interaction and thrust between the corresponding coupled components.

In use, when the secondary body 3 is connected to the main body 2, the main connecting body 15 is coupled to the complementary connecting body 16.

The connection is accomplished by a double male-female coupling. In other words, both the main connecting body 15 and the complementary connecting body 16 act as male element and female element. The complementary connecting element 16, and more specifically, the first end 25a of the cylindrical connecting element 225, is inserted into the sleeve member 24 and comes into abutment against the slider 22 it interacts with.

The outside surface of the first end 25a of the cylindrical connecting element 225 comes into abutment against the outside surface of the slider 22 and pushes it towards the inside of the sleeve member 24 towards the first end 17a of the cylindrical element 17. The slider 22 opposes the force of the spring 23 and thus leaves the radial holes 20 uncovered. At the same time, the head 18 of the cylindrical element 17 comes into abutment against the slider 27 and pushes it towards the second end 25b of the complementary cylindrical element 25. That way, the cylindrical element 17 slides inside the complementary cylindrical element 25. The internal duct 19 of the cylindrical element 17 thus comes into fluid communication with the internal duct 226 of the complementary cylindrical element 25. No fluid is allowed to escape, since the radial holes 20 are not uncovered until the head 18 of the cylindrical element 17 is all the way inside the duct 26 of the complementary cylindrical element 25.

The external sleeve member 24 and the external seals 33 guarantee the fluid tight seal of the valve 13 during connection of the two parts, in the same way as the seals 21 and 32 guarantee the fluid tightness of the individual parts when they are not connected to each other.

A further configuration, not illustrated, comprises a mixing and cooling unit whose hollow space, full of coolant, is isolated, that is to say, is not in fluid communication with the refrigerating unit 4 or with the cooling circuit 10.

The refrigerating unit 4 in any case produces the cooling power that chills the coolant inside the mixing and cooling unit 5.

When the ice cream is ready, the mixing and cooling unit is separated from the refrigerating unit and the hollow space, full of coolant which has been suitably chilled by the refrigerating unit 4 while the ice cream was being made, remains sufficiently cold to keep the mixing and cooling unit and the ice cream inside it cool for long enough to allow the user to enjoy the ice cream at leisure and without hurry.

The invention achieves the preset aims.

In effect, the hollow space, full of coolant, built into the mixing and cooling unit provides a constant source of cold for an extended length of time, even when the mixing and cooling unit is separated from the refrigerating unit.

The connection to the refrigerating unit or to the cooling circuit guarantees improved chilling of the coolant.

The quick coupling valves guarantee an effective fluid-tight seal of the refrigerating unit, also preventing minor leaks that might occur when the two parts are connected and disconnected to and from each other and which would, in the long run, cause the unit to be completely emptied of coolant or lead to the malfunctioning of the machine as a whole.

What is claimed is:

1. A home and professional ice cream product making machine comprising:

a main body, housing a refrigerating unit, and a secondary body, removably attached to the main body, comprising a mixing and cooling unit for freezing the ice cream product and having a vertical axis (X), the mixing and cooling unit interacting with the refrigerating unit;

a lid for allowing access to an inside of the mixing and cooling unit positioned at one end of the mixing and cooling unit;

a stirrer at least partially positioned inside the mixing and cooling unit;

the main body including a motor for connecting to and rotationally driving the stirrer;

wherein the secondary body comprises a hollow space, surrounding the mixing and cooling unit and combined with the mixing and cooling unit, containing a coolant cooled by the refrigerating unit to cool the mixing and cooling unit when the secondary body is attached to the main body, during machine operation, and the hollow space and coolant in the hollow space remaining combined with the mixing and cooling unit to keep the mixing and cooling unit cool when the secondary body is separated from the main body; the coolant in the hollow space being isolated from cooling by the refrigerating unit when the secondary body is mechanically and spatially separated from the main body to interrupt a fluid communication between the coolant in the hollow space and the coolant cooled by the refrigerating unit;

wherein the secondary body is separated from the motor for driving the stirrer when the secondary body is separated from the main body;

a quick coupling mechanism for establishing the fluid communication between the coolant in the hollow space and the coolant cooled by the refrigerating unit when the secondary body is attached to the main body, the quick coupling mechanism including a main body engageable portion connected to the main body and a secondary body engageable portion connected to the secondary body, the main body engageable portion and secondary body engageable portion for engaging one another to establish the fluid communication, the main body engageable portion engaging the secondary body engageable portion to establish the fluid communication as the secondary body is moved into an attachment position on the main body where the stirrer, connected to the motor, can be positioned inside the mixing and cooling unit;

wherein the quick coupling mechanism includes first and second main body engageable portions connected to the main body and first and second secondary body engageable portions connected to the secondary body, the first and second main body engageable portions engageable with the first and second secondary body engageable portions respectively to establish the fluid communication, the first main body engageable portion and the first secondary body engageable portion establishing a male-female coupling, the second main body engageable portion and the second secondary body engageable portion establishing a male-female coupling;

wherein the hollow space is a hollow cooling coil wound around the mixing and cooling unit, the cooling coil having a first end and a second end, the first secondary body engageable portion being connected to the first end and the second secondary body engageable portion being connected to the second end;

wherein the first and second secondary body engageable portions are firmly attached to the secondary body such that movement of the secondary body into the attachment position engages the first and second secondary body engageable portions with the first and second main body engageable portions to establish the fluid communication and movement of the secondary body out of the attachment position disengages the first and second secondary body engageable portions from the first and second main body engageable portions to interrupt the fluid communication.

2. The home and professional ice cream product making machine according to claim 1, wherein the coolant flows inside the hollow cooling coil and is cooled by the refrigerating unit.

3. The home and professional ice cream product making machine according to claim 1, wherein the secondary body is removably connected to the main body by at least one chosen from a fluid connection and a mechanical connection.

4. The home and professional ice cream product making machine according to claim 1, wherein the hollow cooling coil surrounding the mixing and cooling unit is in fluid communication with the refrigerating unit.

5. The home and professional ice cream product making machine according to claim 1, wherein the hollow cooling coil surrounding the mixing and cooling unit is in fluid communication with a cooling circuit which is cooled by the refrigerating unit.

6. The home and professional ice cream product making machine according to claim 5, wherein the cooling circuit interacts with an evaporator of the refrigerating unit for cooling the coolant circulating in the hollow cooling coil.

7. The home and professional ice cream product making machine according to claim 5, wherein the cooling circuit comprises a pump for promoting coolant circulation in the hollow cooling coil.

8. The home and professional ice cream product making machine according to claim 1, wherein the secondary body comprises a grip element associated with the mixing and cooling unit.

9. The home and professional ice cream product making machine according to claim 1, wherein the stirrer is part of the main body.

10. The home and professional ice cream product making machine according to claim 9, wherein the lid is part of the secondary body.

11. The home and professional ice cream product making machine according to claim 1, wherein the stirrer is part of the secondary body.

12. The home and professional ice cream product making machine according to claim 11, wherein the lid is part of the secondary body.

13. The home and professional ice cream product making machine according to claim 1, wherein the main body engageable portion positions the secondary body with respect to the main body as the secondary body is moved into position on the main body.

14. The home and professional ice cream product making machine according to claim 13, wherein the first main body engageable portion and the first secondary body engageable portion together are portions of a first valve and the second main body engageable portion and the second secondary body engageable portion together are portions of a second valve, the first and second valves establishing and interrupting the fluid communication between the coolant in the hollow cooling coil and the coolant cooled by the refrigerating unit.

15. The home and professional ice cream product making machine according to claim 1, wherein the first main body engageable portion and the first secondary body engageable portion together are portions of a first valve and the second main body engageable portion and the second secondary body engageable portion together are portions of a second valve, the first and second valves establishing and interrupting the fluid communication between the coolant in the hollow cooling coil and the coolant cooled by the refrigerating unit.

* * * * *